United States Patent [19]

Shepherd et al.

[11] Patent Number: 5,117,423
[45] Date of Patent: May 26, 1992

[54] DATA TRANSMISSION OVER A TIME DIVISION DUPLEX CHANNEL

[75] Inventors: Robert Shepherd, Canterbury; Frank C. G. Owen, Petts Wood; Christopher D. Pudney, Smallfield, all of England

[73] Assignee: U.S. Philips Corporation, New York, N.Y.

[21] Appl. No.: 527,987

[22] Filed: May 23, 1990

[30] Foreign Application Priority Data

May 26, 1989 [GB] United Kingdom ............... 8912174

[51] Int. Cl.$^5$ .............................................. H04J 3/16
[52] U.S. Cl. ..................................... 370/95.1; 370/31; 370/29
[58] Field of Search ........................ 370/31, 24, 26, 29, 370/95.1; 455/51

[56] References Cited

U.S. PATENT DOCUMENTS

| | | | |
|---|---|---|---|
| 4,470,141 | 9/1984 | Takada | 455/51 |
| 4,672,601 | 6/1987 | Ablay | 370/31 |
| 4,757,496 | 7/1988 | Bartholet et al. | 370/95.1 |
| 4,852,089 | 7/1989 | Berry et al. | 370/95.1 |

Primary Examiner—Douglas W. Olms
Assistant Examiner—Dang Ton
Attorney, Agent, or Firm—Anne E. Barschall

[57] ABSTRACT

A method of, and system for, data transmission over a time division duplex channel in which at least one duplex voice channel constituted by a pair of non-adjacent time slots (or physical channels) in a succession of time frames is allocated for effecting a data transaction between a first and a second station, one of said pair of time slots (or physical channels) being normally designated for unidirectional transmission of data in a first direction between the first and second stations and the other of the pair of time slots (or physical channels) being normally designated for unidirectional transmission of data in a second direction, opposite to the first direction. The system comprises means for determining that either of the time slots (or physical channels) of a duplex voice channel will not participate in, or is not participating in, the transmission of useful data because the data transfer is largely asymmetric and for releasing the non-participating time slots (or physical channels) and making them available for other unidirectional signalling, such as the parallel transmission of data packets in the current data transaction, retransmission of corrupted data packets, or the parallel transmission of data packets in another, largely asymmetric data transaction.

14 Claims, 3 Drawing Sheets

DATA TRANSMISSION OVER A TIME DIVISION DUPLEX CHANNEL

FIELD OF THE INVENTION

The present invention relates to data transmission over a time division duplex (TDD) channel, for example in a digital cordless telephone system having time division multiple access (TDMA) protocol.

FIGS. 1 and 2 of the accompanying drawings illustrate respectively an example of a digital cordless telephone system and the channel and message structure.

The digital cordless telephone system comprises a plurality of primary or base stations PS of which four, PS1, PS2, PS3 and PS4, are shown. Each of the primary stations is connected by way of a respective wideband landline link 10, 11, 12 and 13, capable of carrying data at a rate of say 1.152 Mbits/sec. to cordless telephone system controllers 14 and 15. The system controllers 14 and 15 are, in the illustrated embodiment, connected to the PSTN which is constituted by an ISDN (Integrated Services Digital Network) link.

The system further comprises a large plurality of secondary stations SS some of which, SS1, SS2, SS4 and SS5, are hand portable and are used for digital time division duplex speech communication only. Others, for example SS3 and SS6, are data terminals which also are capable of duplex data communication. Duplex communication between the secondary stations within an area covered by a system controller and/or the PSTN is by way of radio through the primary stations PS. Accordingly the primary and secondary stations each comprise a radio transmitter and receiver.

Referring to FIG. 2, the illustrated system has five radio channels, hereinafter referred to as frequency channels C1 to C5, each capable of carrying digitised speech or data at 1.152 Mbits/sec. The adjacent frequency channel separation is 1.728 MHz. Each frequency channel is divided in the time domain into 10 ms frames. Each frame is divided into 24 time slots (or physical channels) of which the first twelve F1 to F12 are allocated for transmission in a forward direction, that is from a primary station to a secondary station, and the second twelve R1 to R12 are allocated for transmission in the reverse direction. The forward and reverse time slots are twinned, that is, the correspondingly numbered forward and reverse time slots, for example F4, R4, comprise a twin which hereinafter will be referred to as a duplex voice channel. In setting-up a call between a primary and a secondary station, a duplex voice channel is assigned to the transaction. The assignment of the duplex voice channel in any of the frequency channels C1 to C5 is by the method of dynamic channel allocation whereby a secondary station taking account of its radio environment negotiates with the primary station for access to the best duplex voice channel currently available. The system controller 14 or 15 will effect error detection and correction to data received by any one of the primary stations to which it is connected. Error control of the digitised speech is performed by the primary stations.

The general structure of a message is also shown in FIG. 2. The message structure comprises two bytes of preamble 16, two bytes of a synchronisation sequence 18, eight bytes of signalling data 20 and forty bytes of digitised speech or data 22. The digitisation rate and data rate is 32 kbits/sec. Both the primary and secondary stations include a buffer to compress the 32 kbits/sec. data to bursts of data at 1.152 Mbits/sec. so that it is suitable for transmission.

The basic protocol for a transmission which is to be initiated by a secondary station SS is for it to listen to all the forward physical channels in each of the frequency channels C1 to C5 and ascertain which forward physical channels are busy and idle and the relative signal quality in these forward physical channels and from the information derived the secondary station determines what it believes is the best duplex voice channel and transmits in the reverse physical channel of that duplex voice channel to a particular primary station PS. The signalling details 20 in the message together with the details 22 in the initial transmission are decoded and passed to the system controller 14 or 15 which sets-up the fixed network connection. The primary station confirms that the particular physical channel has been assigned to the transaction.

In the forward direction, the primary stations send paging messages to the addressed secondary stations in say every sixteenth frame. Such an arrangement enables the secondary stations to "sleep" during at least the intervening fifteen frames thereby economising on power. An addressed secondary station in response to a paging request addressed to it will, unless a duplex voice channel has been assigned, transmit in the reverse time slot (or physical channel) of the best duplex voice channel. As a general rule the system protocol will give priority to speech over data.

An aspect of data is that it is not unusual for a secondary station SS3 or SS6 to generate batches of data at rates in excess of 32 kbits/sec. Also if the system is to be able to utilise an ISDN fixed wired link then unless buffering is used, the system must be able to supply data at a rate of 144 kbits/sec. One way of doing this would be for a system controller to allocate additional duplex voice channels to the transaction so that data packets can be transmitted in parallel. However whilst this would facilitate the throughput of data, it does involve dedicating two or more duplex voice channels to one data transaction which may be inconvenient at busy periods, especially if the data transaction is asymmetric and the "receive" time slot (or physical channel) is not carrying any signal or has to be padded to maintain overall synchronisation. The term "padding" is to be taken to mean the transmission of data which is not useful to the data transaction proper.

It is an object of the present invention to make more efficient usage of physical channels when transmitting asymmetric messages, particularly data messages, over one or more duplex voice channels.

SUMMARY OF THE INVENTION

According to a first aspect of the present invention there is provided a method of data transmission over a time division duplex channel in which at least one duplex voice channel constituted by a pair of non-adjacent time slots (or physical channels) in a succession of time frames is allocated for effecting a data transaction between a first and a second station, one of said pair of time slots being normally designated for unidirectional transmission of data in a first direction between said first and second stations and the other of said pair of time slots being normally designated for unidirectional transmission of data in a second direction, opposite to the first direction, wherein in response to it being determined that the data transmission will be or is asymmetric, then the time slot not being used for the transmission of useful data will be released and made available for other unidirectional signalling.

The present invention is based on the realisation that asymmetric data transmissions can be wasteful in their usage of duplex voice channels and that if the underused or non-used time slots in the or each duplex voice channel can be made available for other unidirectional signalling then a more efficient usage of the allocated duplex voice channels will be possible because fewer duplex voice channels will be needed for an asymmetric high data rate transaction and also the reduction in the number of duplex voice channels which would otherwise need to be allocated will not have a corresponding effect on the time required to complete the transaction.

The method in accordance with the present invention may be implemented in a number of ways depending on the degree of intelligence built into the system controllers and secondary stations.

For example if it is known in advance or realised that a data transaction will be or is asymmetric then two or more duplex voice channels can be assigned to the data transaction for the duration of the transaction. All but one of the time slots (or physical channels) which it is known will be under-utilised can then be released and made available for other unidirectional signalling which for simplicity will be the transmission of some of the data being transacted in the other time slots (or physical channels) of the assigned duplex voice channels. In other words they will have their direction of transmission or signalling reversed for the duration of the transaction. The remaining non-reversed time slot (or physical channel) in the assigned duplex voice channels is used for the transmission of acknowledgements and perhaps also retransmission requests.

The reversing of the under-utilised time slots (or physical channels) can be done dynamically in response to monitoring the duplex voice channels and detecting either the absence of signals or the presence of excessive padding and the system controller and/or secondary station deciding to reverse the particular time slots (or physical channels).

It may arise that the ISDN link has data for forward transmission to a secondary station which is already involved in an asymmetric data transmission in the reverse direction. Instead of the system controller and/or the secondary station taking back the reversed time slots (or physical channels) and using them for the forward transaction, the assignment of the duplex voice channels, including the reversal of the time slots (or physical channels), to the reverse transaction is maintained and additional duplex voice channels with suitable reversing of time slots (or physical channels) are devoted to the new forward asymmetric data transaction. At the completion of either data transaction, the relevant assigned duplex voice channels are simply made available to other users of the system.

According to a second aspect of the present invention there is provided a communications system comprising at least one primary station, a system controller connected to the at least one primary station, a data secondary station, the primary and secondary stations each having transceivers for time division duplex radio transmissions therebetween in at least one duplex voice channel constituted by a predetermined pair of non-adjacent time slots (or physical channels) in a succession of time frames, the respective time slots being provided for unidirectional transmission in opposite directions, the system controller and the data secondary station each having means for assigning at least one duplex voice channel for a data transaction and means for determining if the data transaction will be or is asymmetric and for releasing the time slot not being used for the transmission of useful data and making it available for other unidirectional signalling.

BRIEF DESCRIPTION OF THE DRAWING

The present invention will now be explained and described, by way of example, with reference to the accompanying drawings, wherein.

In the drawings the same reference numerals have been used to indicate corresponding features.

DESCRIPTION OF THE PREFERRED EMBODIMENT

Figure 2:
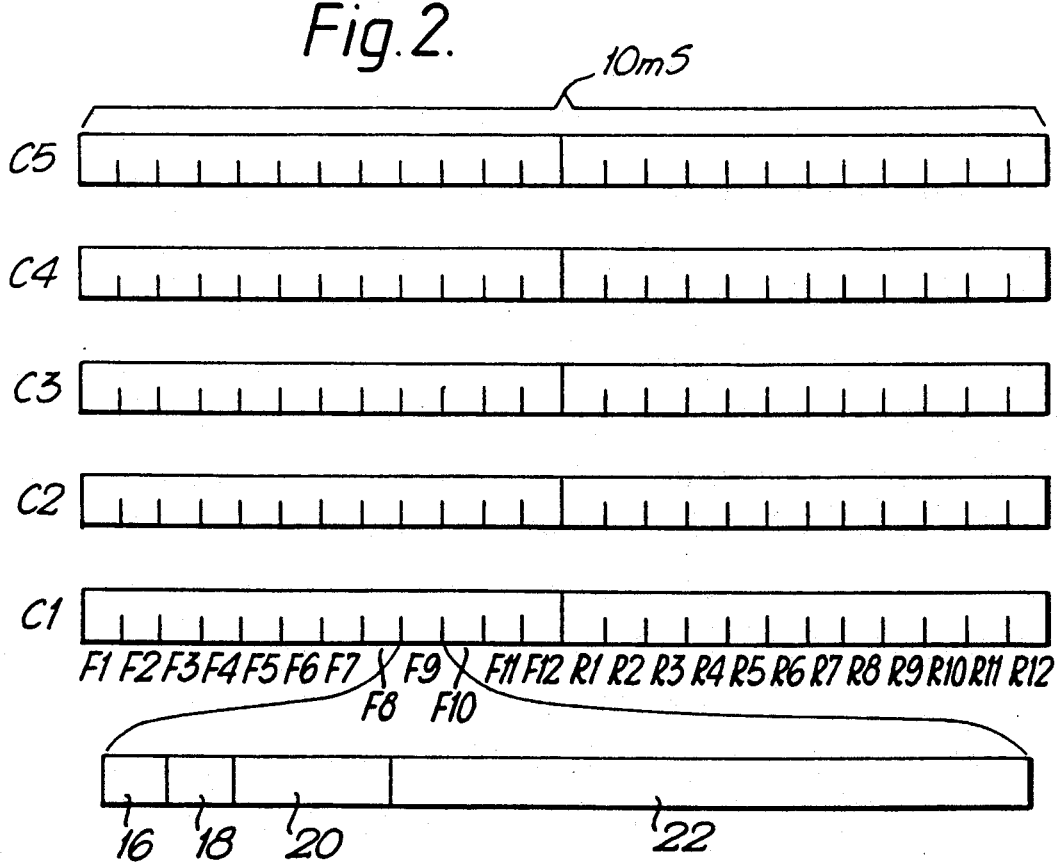
FIG. 2 illustrates the channel and message structure used in the system shown in FIG. 1.
Figure 3:
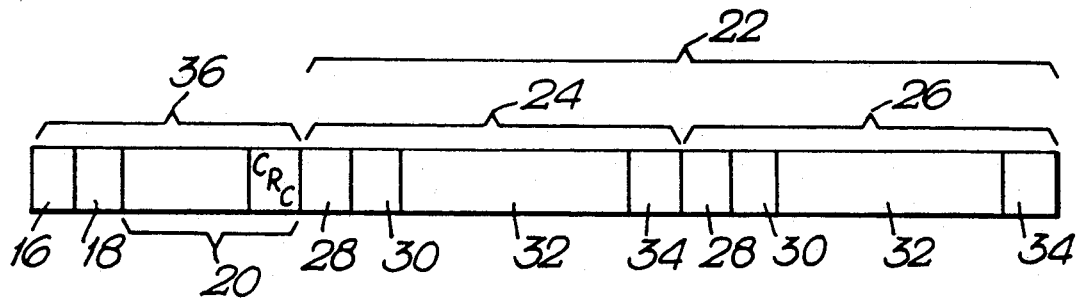
FIG. 3 illustrates the structure of a data message in which there are two data packets to a time slot (or physical channel)

Referring initially to FIG. 3, the structure of the data message is a variation on the message structure shown in FIG. 2. The main difference is that the portion 22 is composed of first and second data packets 24, 26. Each data packet includes for example a data control field, 28, a packet numbering field 30, a data field 32 and a field 34 for error detection. For the sake of completeness the signalling data field 20 relating to the radio link control has also been shown as including a CRC field. The message portion 36 is used in the primary station(s) and may be forwarded to the system controller 14 or 15. As mentioned in the preamble, the system controller 14 or 15 and the secondary stations receive the data packets, check each packet for errors and where possible corrects the errors using an algorithm stored in an error correction section of a control module in the system controller and secondary station. However if a data packet is so corrupted that it cannot be corrected then the control module sends a request for a retransmission of that packet or packets in the first possible forward or reverse time slot (or physical channel). On receipt of a retransmission request, a secondary station or system controller will retrieve the or each data packet using its packet number and retransmit it in the next reverse or forward time slot(s) (or physical channel(s)). If it is ascertained from local signal quality measurements that the corruption is due to a poor radio link between the secondary station and a particular primary station, the secondary station may handover and communicate via another in-range primary station and/or in another duplex voice channel. If the data rate of the basic message is greater than 32 kbits/sec. then, in order to avoid an excessively large backlog being built up, the system controller and/or secondary station will, if possible, allocate one or more duplex voice channels to the transaction. However as many data transfers are asymmetric with say a large quantity of data packets going in say the reverse direction and only acknowledgements and possibly retransmission requests in forward direction, then there is either a general absence of signals in the forward direction or in order to maintain synchronisation within the TDD structure it has been customary to pad-out the time slot(s) in the acknowledgement direction; the data control field 28 can be used to indicate to the primary and secondary stations, that padding bits have been used.

In accordance with the present invention, the system controller or secondary station in response to determining in advance that a data transaction is asymmetric or determining that a large number of useful packets are being sent in one direction and either no signals or padded data packets are being sent in the opposite direction, thus indicating an asymmetric data transmission, releases the time slot(s) (or physical channel(s)) of the assigned duplex voice channels which are then available for unidirectional data transfers in the opposite direction. The released time slot(s) (or physical channel(s)) can be reallocated for other purposes which will increase the overall efficiency of the system. A first possible option is to permit the use of the released time slot(s) (or physical channel(s)) for unidirectional transmission in said one direction so that the pair of time slots (or physical channels) of the or each assigned duplex voice channel are used for transmission of data packets. Exercising this option will involve the system controller or secondary station effecting the reversal of the direction of unidirectional signalling in the released time slot. In the case of two or more duplex voice channels being assigned to the transaction then the time slot (or physical channel) in one of the duplex voice channels will not be reversed and will be retained for the signalling of acknowledgements and retransmission requests.

In an extension of the first option if, for example, the current asymmetric data transaction is in the reverse direction and the ISDN link has, or subsequently has, data for forward transmission to the same secondary station whilst the first mentioned data transaction is continuing then subject to availability the system controller grabs one or more non-assigned duplex voice channels and sets up another data transaction involving time slot (or physical channel) reversals and so forth. Such an arrangement provides some flexibility in operation because once either one of the data transactions ceases the particular duplex voice channels are released and immediately are available to other system users.

A second possible option is to permit the use of the released time slot(s) (or physical channel(s)) for the transmission of data relating to a second transaction to say the secondary station participating in the original data transmission. The second transaction may involve the same or a different primary station.

A third possible option is to assign the released time slot(s) (or physical channel(s)) to another data transaction which is asymmetric in the opposite direction and which does not involve the same secondary station. In order to do this the system controller will have to instruct the primary and secondary stations participating in the original transaction that it is releasing the time slot(s) (or physical channel(s)) concerned and inform the stations involved in the other transaction that they have been assigned another (or other) unidirectional time slot(s) (or physical channel(s)) for their use.

The range of options made available depends on the intelligence provided in the system controller. However an overriding factor is that the use of pairs of time slots (or physical channels) within a frame format is maintained.

Figure 1:
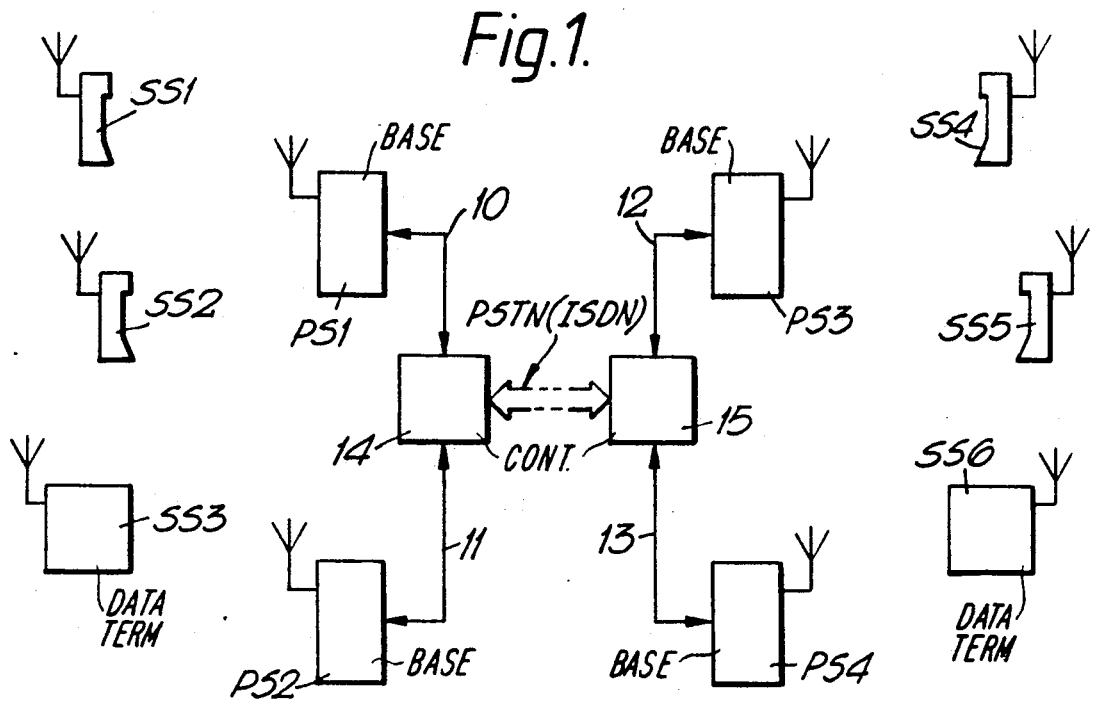
FIG. 1 is a block schematic diagram of an example of a digital cordless telephone system.
Figure 4:
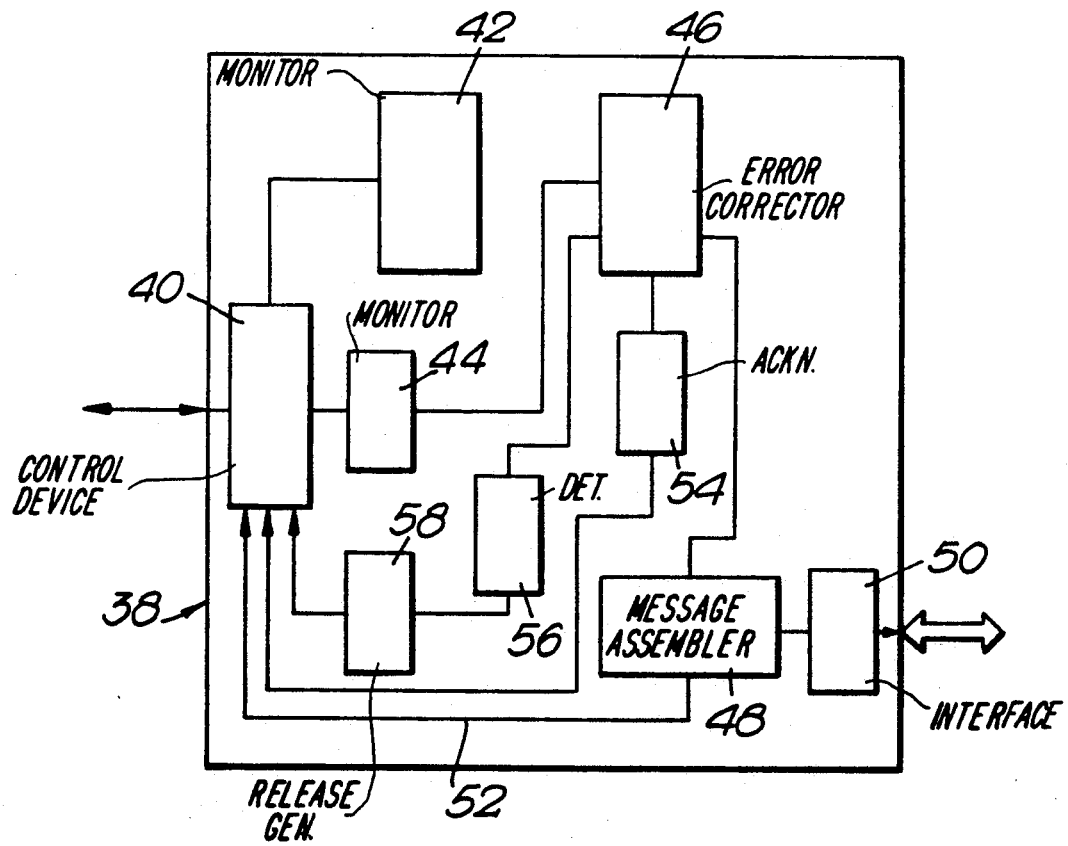
FIG. 4 is a block schematic diagram of an intelligent controller which can be used in a system controller or a secondary station.

FIG. 4 illustrates diagrammatically an intelligent controller 38 which can, for example be used as part of the controller 14 or 15 in FIG. 1 or in an intelligent data secondary station. The controller 38 comprises a control device 40 which serves amongst other things to control the routing of data within the controller. Means 42 are connected to the device 40 for monitoring the radio channels, for maintaining a record of the busy and idle duplex voice channels and for possibly re-allocating the time slots (or physical channels) of the duplex voice channels. A data monitor 44 directs data packets to an error checking and correction stage 46. Data packets which have been deemed correct by the stage 46 are transferred to a message assembler 48 which builds up the message using the packet numbering system. Messages to be outputted are transferred to an output interface 50 which may be coupled to an ISDN link. Input message data from an external source such as the ISDN link are transferred to the message assembler 48 by the interface 50. Assembled messages for onward transmission are routed to the control device 40 using the bus 52.

Acknowledgements for the receipt of correct packets are generated in a stage 54 and relayed to the control device 40 for onward transmission. If any of the data packets are found to be uncorrectable then the error correction stage 46 instructs the stage 54 to include a retransmission request in the acknowledgement which it is going to send.

The data from the error correction stage 46 is also sent to detector 56 adapted to detect an absence of signals or the presence of padding. In response to the detection of an absence of signals or padding bits in the same time slot(s) of successive frames, the detector 56 instructs a stage 58 to generate a time slot (or physical channel) release instruction which is sent to the control element 40 which decides what should be done with the time slot(s) (or physical channel(s)) to be released and issues the necessary instruction to the primary and secondary stations by way of the wideband link 10.

Whilst the controller 38 has been shown as comprising a plurality of circuit stages, it could be implemented using a suitably programmed microcontroller.

Figure 5:
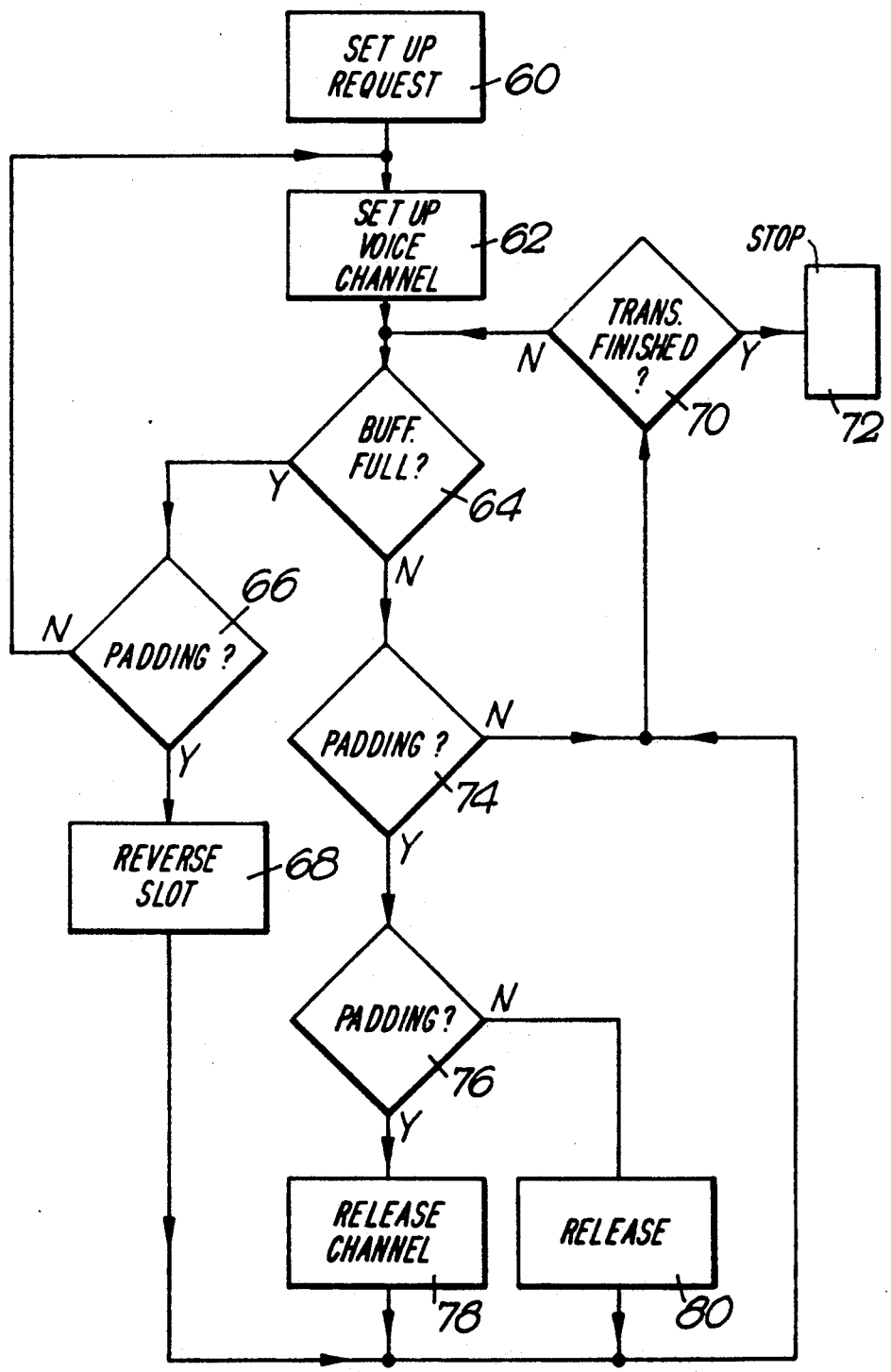
FIG. 5 is a flow chart relating to an implementation of an intelligent controller.

A flow chart for such a controller 38 will now be described with reference to FIG. 5 and is applicable to a system controller 14, 15 (FIG. 1) as well as to a data secondary station. For convenience the flow chart will refer to the detection of padding only.

Stage 60 indicates a request for the setting-up of a data transaction. Stage 62 indicates the operation of the controller setting up one or more duplex voice channels. Decision stage 64 asks the question "Is the transmit data buffer filling-up?" If the answer is YES(Y) than a decision stage 66 asks the question "Are the time slots in the other direction being padded?" If the answer is NO(N) then the flow chart reverts to the stage 62. However if the answer is YES then stage 68 describes the operation of reversing the time slot (or physical channel) of the particular duplex voice channel. This time slot (or physical channel) reversal state persists until it is reversed again or the call has finished which is indicated by the decision stage 70 which asks the question "Has the data transaction finished? If the answer is YES then the transaction is terminated as indicated by the stage 72. If the answer is NO then the flow chart returns to the decision stage 64.

A NO answer from the decision stage 64 leads to a decision stage 74 which asks the question "Am I padding? A NO answer refers one to the decision stage 70.

A YES answer directs one to a decision stage 76 which asks the question "Are the other time slots in the other direction being padded? In response to a YES answer, a stage 78 gives the instruction to release a duplex voice channel because if both ends are padding, there are too many duplex voice channels assigned to the transaction. A NO answer causes a stage 80 to instruct the release of a time slot (or physical channel) either for the other station involved in the data transaction to use or for use in another data conversation. The outputs from the stages 78, 80 lead to the decision stage 70.

From reading the present disclosure, other modifications will be apparent to persons skilled in the art. Such modifications may involve other features which are already known in the design, manufacture and use of data transmission systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combination of such features during the prosecution of the present application or of any further application derived therefrom.

We claim:

1. A method of data transmission between a first station and a second station over a time division duplex radio channel comprising the steps of:
    allocating at least one duplex voice channel constituted by a pair of non-adjacent time slots, in a succession of time frames for effecting a data transaction;
    default designation one of said pair of non-adjacent time slots for undirectional transmission of data in a first direction between said first and second stations and the other of said pair of time slots for unidirectional transmission of data in a second direction, opposite to the first direction;
    determining if the data transaction will be asymmetric;
    releasing the time slot not being used for the transmission of useful data for other unidirectional signalling in response to the determining step.

2. A method as claimed in claim 1, comprising determining in advance that the data transaction will be asymmetric and releasing the time slots as part of establishing a call.

3. A method as claimed in claim 1, comprising the step of monitoring the duplex voice channel(s) to determine if the data transaction is asymmetric.

4. A method as claimed in claim 3, comprising monitoring the duplex voice channels for padding signals.

5. A method as claimed in claim 3, comprising monitoring the duplex voice channels for the absence of useful data signals.

6. A method as claimed in any one of claims 1 to 5, comprising making the released time slot available for undirectional signalling in the opposite direction.

7. A method as claimed in claim 6, comprising using the released time slot to transmit data packets forming part of the data message being transacted in the other of the pair of time slots.

8. A method as claimed in any one of claims 1 to 5, comprising making the released time slot available for the unidirectional transmission of data packets forming part of another data message being transaction in another duplex voice channel.

9. A method as claimed in any one of claims 1 to 5, comprising allocating at least two duplex voice channels to a data transmission.

10. A method as claimed in claim 9, comprising using the non-data transmitting time slots of one of the duplex voice channels for the transmission of acknowledgements relating to the data transaction, and releasing the balance of the non-data transmitting time slots of the, or each of the assigned duplex voice channels for unidirectional signalling in the opposite direction, of data comprising part of the data transaction.

11. A method as claimed in claim 9, comprising, in the event of a second data transaction being set-up involving the same secondary station, assigning at least one further duplex voice channel to the second data transaction, and releasing and making available for other unidirectional signalling those time slots not being used for the transmission of useful data relating to the second data transaction.

12. A communications system comprising at least one primary station, a system controller connected to at least one primary station, a data secondary station, the primary and secondary stations each having transceivers for time division duplex radio transmissions therebetween in at least one duplex voice channel constituted by a predetermined pair of non-adjacent time slots, in a succession of time frames, the respective time slots being provided for unidirectional transmission in opposite directions, the system controller and the data secondary station each including means for assigning at least one duplex voice channel for a data transaction, means for determining if the data transaction will be or is asymmetric and for releasing the time slot not being used for the transmission of useful data and making it available for other unidirectional signalling.

13. A system as claimed in claim 12, comprising means for monitoring the duplex voice channels for the absence of useful data signals.

14. A system as claimed in claim 12, comprising means for monitoring the duplex voice channels for the presence of padding.

* * * * *